United States Patent [19]

Draebel et al.

[11] Patent Number: 5,119,926
[45] Date of Patent: Jun. 9, 1992

[54] PRODUCT RETAINING/SUPPORT FRAME ASSEMBLY FOR A MODULAR LINK CONVEYOR SYSTEM

[76] Inventors: Jorgen Draebel; James L. Layne, both of P.O. Box 293, Glasgow, Ky. 42141

[21] Appl. No.: 678,109

[22] Filed: Apr. 1, 1991

Related U.S. Application Data

[62] Division of Ser. No. 456,390, Dec. 26, 1989, Pat. No. 5,031,757.

[51] Int. Cl.⁵ ............................................. B65G 21/20
[52] U.S. Cl. .................................................. 198/836.3
[58] Field of Search .................. 198/836.1, 836.3, 841, 198/852

[56] References Cited

U.S. PATENT DOCUMENTS

| | | |
|---|---|---|
| 3,313,400 | 4/1967 | Johnson . |
| 3,844,405 | 10/1974 | Shuford . |
| 3,874,497 | 4/1975 | Carlson ........................... 198/836.3 |
| 4,399,908 | 8/1983 | Gunti . |
| 4,535,963 | 8/1985 | Lachonius ....................... 198/836.1 |

FOREIGN PATENT DOCUMENTS 2544292 10/1984 France .............................. 198/836.3

Primary Examiner—Joseph E. Valenza

[57] ABSTRACT

A product retaining/support frame assembly is provided for a conveyor system utilizing a conveyor belt formed from a plurality of modular links mounted by a plurality of transverse cross rods that retain the links together. The modular links include side link portions that are adapted to engage conveyor guide rails integral with the support frame assembly. The frame assembly further includes side rails attached to side rail brackets. These are provided adjacent the peripheral edges of the conveyor belt to maintain the transported product on the conveyor belt. The side rail brackets include a horizontally extending leg passing through a cross bar that supports the attached guide rails. The bore of the cross bar has grooved side surfaces to mate with ridged surfaces included on the horizontal leg of the side rail brackets. Support brackets provided at strategic positions assist in supporting the weight of the entire conveyor system.

7 Claims, 3 Drawing Sheets

PRODUCT RETAINING/SUPPORT FRAME ASSEMBLY FOR A MODULAR LINK CONVEYOR SYSTEM

TECHNICAL FIELD

This application is a divisional application of U.S. application Ser. No. 07/456,390, filed Dec. 26, 1989, now U.S. Pat. No. 5,031,757, issued Jul. 16, 1991 and entitled MODULAR LINK CONVEYOR SYSTEM WITH NARROW CHAIN.

The present invention relates generally to conveyor systems, and more particularly, to a modular link conveyor system particularly utilized with narrow chain operation.

BACKGROUND OF THE INVENTION

Due to the rapid improvement in food processing and related technologies, conveyor systems are now an integral part of the vast majority of such operations. Automation has effected a tremendous increase in the speed of product travel on the product line from beginning to end. The speed of operation has generated a need to quickly and efficiently transport work in progress between successive work stations along the production line.

Many production facilities have focused on the more efficient use of space in an effort to reduce costs and maximize profitability. Thus, manufacturers are increasingly desirous of conveyor systems that can efficiently operate while occupying as small an area as possible. To do so there must be a capability to move product smoothly around curves as well as along extended straight runs.

It can be appreciated that providing a narrower chain width for a conveyor system presents certain problems. There is inherently less flexibility making smooth operation more difficult to achieve. This can greatly reduce the efficiency of product filling and handling operations.

There is also a need for improved product control, especially along the sides of the conveyor. As is well known in the art, side rails are commonly used to assist in this process of retaining product on the conveyor belt. A variety of means for mounting the side rails on the conveyor system have been offered. U.S. Pat. No. 3,844,405 to Shuford, issued Oct. 29, 1974, discloses laterally adjustable L-shaped brackets having horizontal tongues extending into a tubular member between the conveyor guide rails. The tongues are positioned in different horizontal planes and are locked within the tubular member by an adjustable wedge assembly. The positioning of the locking means is, however, inconvenient for effecting an adjustment of the brackets.

The same disadvantage is associated with U.S. Pat. No. 3,313,400 to Johnson, issued May 6, 1965. The Johnson conveyor system provides L-shaped brackets for mounting side rails that are laterally adjustable along an angle iron support member. The brackets are held in position solely by a bolt that is directly under the conveyor system. Both of the above described mounting means are inconvenient for operators to adjust during changeover of product.

Accordingly, a need exists to provide the conveyor system with improved means to positively retain transported items on the conveyor belt. The product retaining means would be laterally adjustable and integrated with the conveyor system so as to operate efficiently in transporting items within the narrow space provided, including around bends or corners. In addition, the conveyor system would be structurally compact in itself so as to provide maximum transport capability while saving as much space as possible for other aspects of the product handling operation. Further, the system would have an open design to facilitate removal of debris and product residue by cleaning and to allow system adjustment.

SUMMARY OF THE INVENTION

It is a primary object of the present invention to provide a product retaining/support frame assembly for a modular link conveyor system capable of efficiently operating in narrow transport space.

It is still another object of the invention to provide a product retaining/support frame assembly for a modular link conveyor system adapted to positively and efficiently retain transported product on the conveyor belt.

Still another object of the invention is to provide a conveyor system with side rail brackets that are laterally adjustable so as to position the associated side rails at the desired spaced width.

An additional object of the present invention is to provide a conveyor system especially adapted for food processing with all component parts having a substantially open design so as to facilitate the removal of debris and product residue by cleaning and to facilitate access for easy system adjustment.

It is a further object of the present invention to provide a conveyor system with an integrated support structure that cooperates with the product retaining means to provide firm support while aiding in the efficient transport of product through a processing facility.

Yet another object of the present invention is to provide a conveyor system capable of efficiently and reliably operating with a narrow width chain that is relatively simple and inexpensive to produce, install and maintain.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and others objects, and in accordance with the purposes of the present invention as described herein, a product retaining/support frame assembly is provided for a modular link conveyor system with a narrow chain. The conveyor system can be used in a variety of food processing operations and the like, and is especially advantageous in operations requiring reduced space to transport product in progress between successive process stations.

In this invention a conveyor frame is provided to support and guide the conveyor belt. The frame includes a pair of guide rails attached to a plurality of cross bars that provide spacing and support. Advantageously, the conveyor frame supports and guides the endless conveyor belt in both the feed and return directions. More specifically, upper and lower horizontally extending lips are integrally provided on the guide rails. The upper lip acts as the upper guide for the side portions as well as providing a supporting structure for the belt. The lower lip acts as a lower guide for the return of the endless conveyor belt. The transverse tabs provided on the depending arms of the side portions ride on the lower lip in the return direction. This advantageously precludes the need for any additional supporting structure for the belt return. This feature aids in reducing system complexity and also reduces the amount of space required for the conveyor system.

In addition to retaining the guide rails in spaced relation, the cross bars further function to receive and support side rail brackets. The cross bar has a substantially rectangular bore extending horizontally therethrough. The full extension of the bore through the cross bar advantageously allows the horizontal legs of the side rail brackets (more fully described below) to extend completely therethrough, maximizing the support capability of the cross bar for the side rail brackets. This further allows the side rail brackets to be positioned as near to the peripheral edges of the conveyor belt as possible. In addition, the open design of the cross bar facilitates the complete passage of washing compounds to aid in the removal of any product residue. The cross bar is advantageously formulated of tough plastic material and is non-corrosive.

In an important aspect of the invention, the side surfaces of the horizontal bore of the cross bar are provided with grooves. The grooves mate with ridges on the horizontal legs of the side rail brackets to assist in their secure engagement.

Side rails attached to the brackets assist in retaining transported product on the conveyor belt. The side rails run longitudinally along the side and above the vertical plane of the surface of the conveyor belt.

The side rail brackets are positioned in pairs, one on each side of the conveyor belt at the same longitudinal position along the belt. The side rail brackets are preferably formulated of durable plastic and further are substantially "L" shaped. The lower or horizontal leg of the "L" passes through and is secured within the cross bar. Each of the pair of the side rail brackets is symmetric to the other. Thus, the lower leg of one bracket extends through and occupies substantially one half of the horizontal bore in the cross bar while the lower leg of the opposing side rail bracket passes through and occupies substantially the other half. Ridged surfaces are provided on one side of the lower leg of each side rail bracket to engage the cooperating grooved side surface of the horizontal bore in the cross bar, as described above. More specifically, the inner surface of the horizontal bore and the appropriate surfaces of the lower leg of the side rail brackets all cooperatively engage one another to provide a tight frictional fit within the cross bar to provide the appropriate support.

The upper leg of the side rail brackets includes a vertical slot extending along substantially one half the length of the upper leg. The outer surface of the upper leg of the side rail brackets includes a pair of grooves also extending substantially the length of the upper leg. These grooves mate with a lock plate designed to assist in fixing the side rails in the desired vertical position. More specifically, a locking bolt passes through the lock plate and is secured to the side rail attachment that abuts the inner surface of the upper leg. Advantageously, the lock plate substantially reduces the stresses generated in the side rail brackets by the force required to secure the side rails in position.

Advantageously, the slot in the upper leg allows the side rail to be adjusted through a substantial range of vertical positions. In addition, the slot also allows the option of providing a plurality of side rails to be used together, each at a different vertical position. This feature provides flexibility in allowing the conveyor system to transport a variety of items of different sizes and shapes.

The cooperating means of attachment between the side rails and the side rail brackets not only provides a means of retaining product on the conveyor belt, but also provides protection for the space outside the conveyor belt. More specifically, the side rail brackets do not have any mechanical attachment mechanisms protruding substantially therefrom. This not only protects operators working near the conveyor belt but also substantially facilitates continuous operation. This is accomplished by eliminating the possibility of a disruption in operation caused by engagement by the operator or another piece of equipment with a protruding part.

The conveyor system further includes floor support means at strategic positions along the conveyor assembly. The support brackets function to provide the needed support at strategic locations and further cooperate in allowing attachment of the cross bar, side rail brackets and guide rails. More specifically, the support brackets include an orifice through which the horizontal legs of the side rail brackets pass through as they are positioned within the cross bar.

The support brackets also have slots to allow the installation of a fluid collection tray below the conveyor belt. This advantageously allows fluids dripping from product being transported on the belt to be collected and carried to a central location for processing and/or disposal. Support legs mount each support bracket so that the conveyor is positioned at the proper working height.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 4 is a partial side elevational view of the side rail bracket of the present invention showing the bracket lock plate;

FIG. 5 is a cross sectional view of the cross bar of the present invention showing the inner ridged side surfaces of the horizontal bore.

Figure 1:
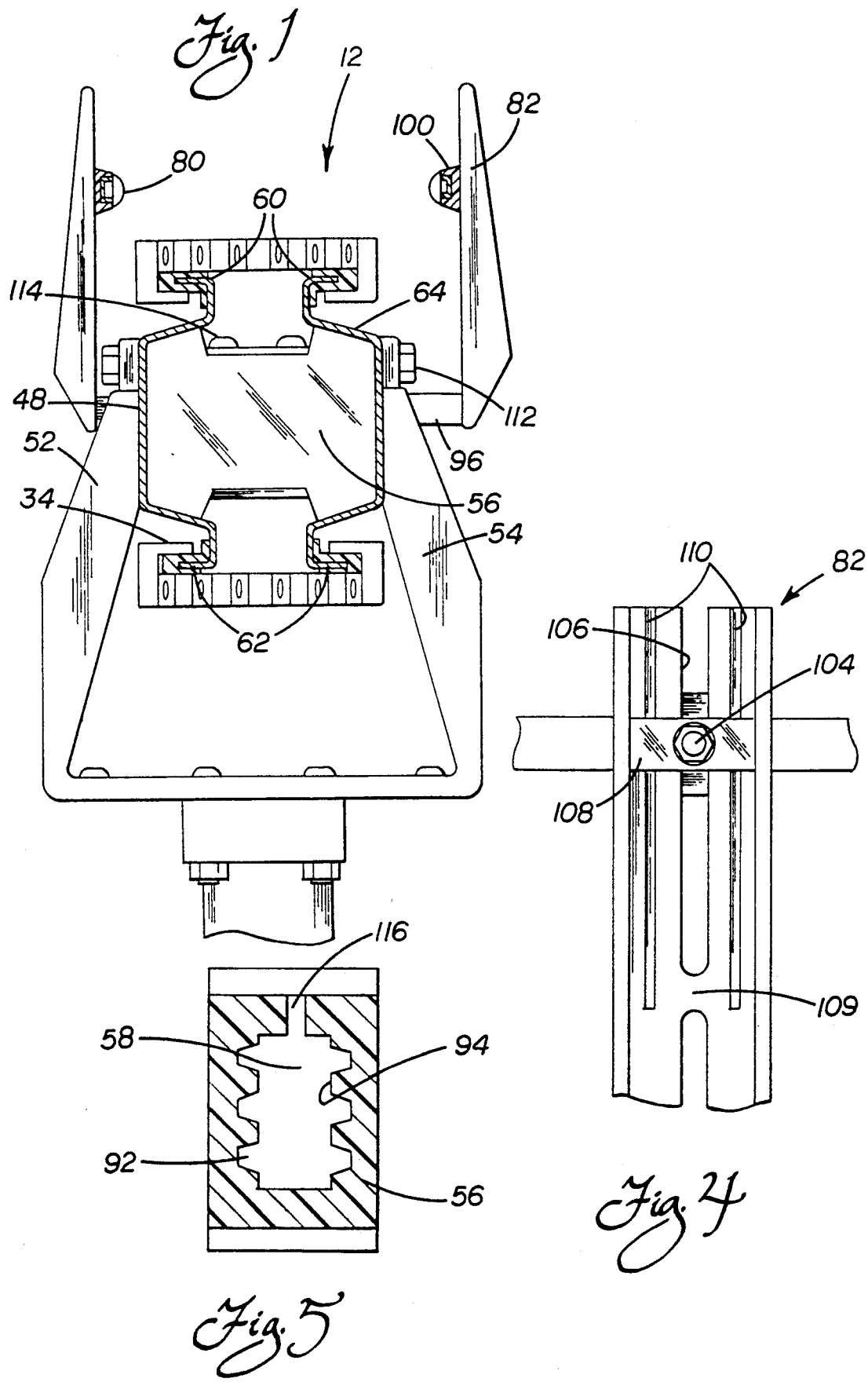
FIG. 1 is a cross sectional view of the conveyor system of the present invention showing the integral belt feed and return feature of the conveyor frame and further showing the relationship between the side rail brackets, the cross bar and the support brackets.

Reference will now be made in detail to the present preferred embodiment of the invention, an example of which is illustrated in the accompanying drawing.

DETAILED DESCRIPTION OF THE DRAWING

Figure 2:
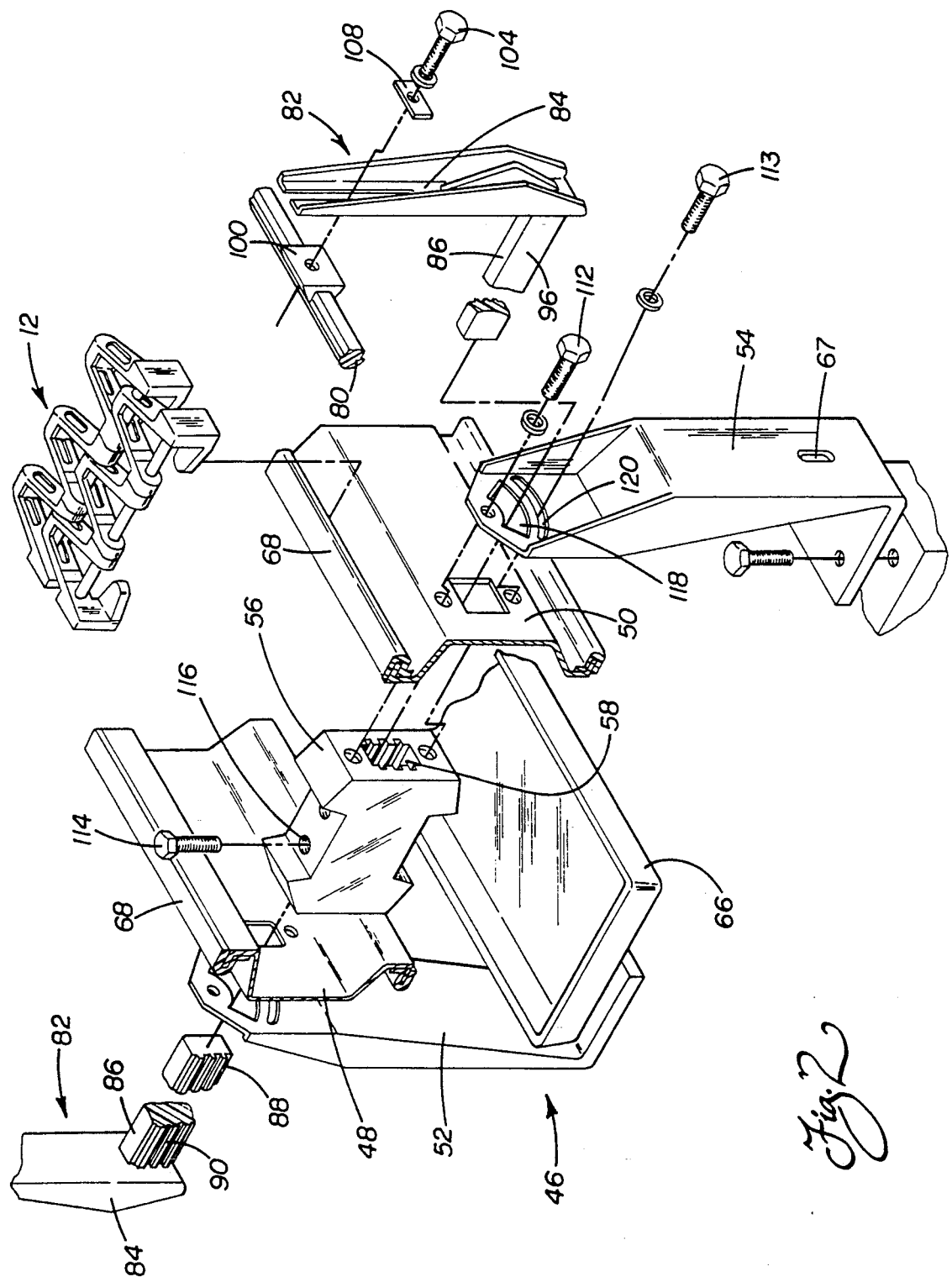
FIG. 2 is an exploded view of the conveyor system of the present invention showing the interrelationship of the individual components.

A conveyor frame, generally designated by the reference numeral 46, is provided to support and guide the conveyor belt 10 of the conveyor system 12 (see FIG. 2). A detailed description of the conveyor system 12 in which the preferred embodiment of the present invention is used is provided in commonly assigned U.S. Pat. No. 5,031,757, the specification of which is incorporated by reference. The conveyor frame 46 includes guide rails 48, 50 to engage the belt at its lateral edges. Support brackets 52, 54 support the guide rails as needed at strategic positions along the conveyor system 12 (see also FIG. 1). Support legs 55 place the conveyor system 12 at the appropriate working height.

In accordance with a further aspect of the invention, a cross bar 56 is provided to retain and secure guide rails 48, 50 in proper spaced relation. In the preferred embodiment, the cross bar 56 is fabricated of plastic to provide durability, strength and corrosion resistance. As best shown in FIG. 5, the cross bar 56 has a lateral bore 58 extending therethrough. The lateral bore 58 cooperates with additional components (as described below) to assist in maintaining product on the conveyor belt 10. The open design further facilitates cleaning, as the bore 58 allows washing compounds to flow therethrough to remove product residue that may accumulate.

As shown in FIG. 1 and according to yet another important aspect of the present invention, the guide rails 48, 50 support and guide the endless conveyor belt 10 in both the feed and return directions. As shown, upper and lower horizontally extending lips 60, 62, respectively, are provided at each side. The upper lip 60 serves a dual function. First, the upper horizontal surface provides product support. Secondly, the peripheral edge of the lip 60 engages arms 32 of side portions 24 to laterally guide the belt 10.

The conveyor belt 10 is supported in the return direction by the lower lip 62 engaging the tabs 34 on the side portions 24 of the links 14. Thus, the conveyor frame 46 advantageously supports and guides the conveyor belt 10 in both the feed and return directions without additional supporting hardware as required by many of the prior art systems. This results in reduced equipment costs as well as simplified installation.

The frame 46 also is designed to minimize the build-up of product residue and simplify cleaning as much as possible. In particular, it should be appreciated that the arms 32 and the tabs 34 ride on the outside of the frame 46 where they can be easily inspected and cleaned. Further, frame portions 64 just below the upper lip 60 slope downwardly. This serves to facilitate liquid run-off and prevent the settling of residue. This run-off may be collected in a fluid collecting tray 66 provided below the conveyor belt 10, as shown in FIG. 2. The support brackets 52, 54 include slots 67 to assist in positioning and supporting the fluid collecting tray 66.

Figure 3:
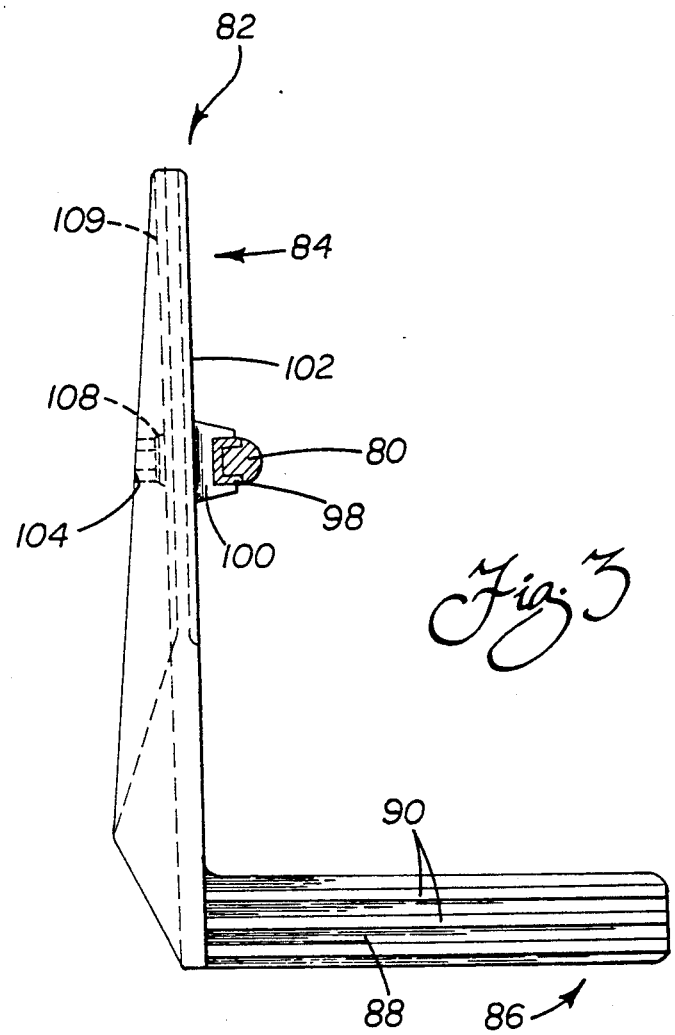
FIG. 3 is an elevational view of the side rail bracket of the present invention showing the side rail in cross section.

To improve the efficient operation of the conveyor system 12, one or more pairs of plastic side rails 80 are provided in longitudinal orientation on opposing sides of the conveyor system 12 to assist in retaining product on the conveyor belt 10. The narrow width belt can thus convey narrow product and maneuver in the reduced spaces available in many present food processing facilities. A plurality of side rail brackets 82 are provided to support and position the side rails 80. As shown in FIG. 3, the side rail brackets 82 include a vertically extending leg 84 adapted to receive and position the side rails and a horizontally extending leg 86 that cooperates with cross bar 56 to provide firm support. As can be appreciated by reference to FIGS. 2 and 3, the side rail brackets 82 are substantially L-shaped. In the preferred embodiment, the side rail brackets 82 are fabricated of plastic to maintain the high quality of the conveyor system 12 while retaining the desired strength needed to resist normally expected forces. In addition, the side rail brackets 82 being of plastic, are non-corrosive and as with the other components previously described, are easily cleaned.

The side rail brackets 82 are mounted on the conveyor frame 46 in cooperating pairs; that is, two side rail brackets 82 are positioned directly opposite each other on opposite sides of the conveyor frame 46 at strategic locations along the conveyor system 12. Advantageously, the brackets 82 are symmetrical so that they are interchangeable between opposing sides of the conveyor frame 46.

The outer surface 88 of the horizontally extending leg 86 (as referenced to its seated position within the lateral bore 58) includes a plurality of ridges 90 that mate with grooves 92 on the side surfaces 94 of the lateral bore 58 (see FIG. 5). The inner surface 96 (see FIG. 1) of each horizontally extending leg 86 has a smooth face that further assists in mounting and stabilizing the brackets 82. These two smooth surfaces cooperate back-to-back creating the firm and tight supporting engagement needed for the desired result.

With reference again to FIG. 3, the side rail 80 is held within jacket 98 forming a part of mount 100. The mount 100 engages the inner face 102 of the vertically extending leg 84 and is secured thereto by bolt 104 that extends through vertical slot 106 in vertically extending leg 84 (see FIG. 4). Advantageously, a lock plate 108 is provided to be positioned between the bolt 104 and the outer face 109 of leg 84 to distribute the forces generated by tightening the mount 100 on the bracket 82. Lock plate 108 includes a pair of notches (not shown) that mate with vertical grooves 110 in the outer face 109 of vertical leg 84 (see FIG. 4). Lock plate 108 thus advantageously allows the side rail 80 to be very tightly secured to side rail brackets 82 while minimizing the chance of structurally damaging the bracket 82.

The vertical slot 106 extends from the top of leg 84 a distance substantially half way down. Thus, it can be appreciated that the position of side rail 80 can be adjusted through a broad vertical range along the slot 106. Accordingly, the conveyor system 12 can transport and feed products of varying heights. This is important since the vertical position of the side rail 80 in relation to the center of mass of the product is very critical.

It can be further appreciated that the broad vertical range provided by slot 106 allows the option of simultaneously attaching a plurality of side rails 80 to the brackets 82 at different vertical positions. This feature can be particularly desirable when the conveyor system 12 is simultaneously transporting different products of varying heights.

Similarly, it can be appreciated that the side rail brackets 82 may be positioned over a broad range of lateral (horizontal) positions. This range of positions is determined by the extent to which the horizontally extending legs 84 are inserted into cross bar 56. The ridged outer leg surfaces 88 securely engage the grooved side surfaces 94 of the lateral bore 58 to form a tight fit within the lateral bore 58. To further enhance the support capability of the side rail brackets, the smooth face inner leg surfaces 96 of opposing brackets 82 tightly and frictionally engage each other to assist in providing a firm support for the side rails 80.

Advantageously, once the side rails 82 are set to the desired spaced width through lateral adjustment, the operator can secure set screws 114 in threaded holes 116 in the cross bar 56 to provide additional security to the firm position of the side rail brackets 82. This operation is easily accommodated due to the open design provided by the links 14. Thus, as best shown in FIGS. 1 and 2, the support brackets 52, 54, guide rails 48, 50, cross bar 56 and side rail 80 on side rail brackets 82 integrally cooperate to provide the desired support for product on the conveyor system 12. The support brackets 52, 54, guide rails 48, 50 and cross bar 56 are secured together by upper and lower bolts 112, 113, respectively.

As is shown in FIG. 2, the support brackets 52, 54 may be provided with apertures formed as arcs to assist in allowing the conveyor system 12 to operate through changes in grade elevation. The aperture 118 allows the horizontally extending legs 86 to be installed and operated in the inclined orientation. In addition, arc slot 120 may be provided to cooperatively allow a like degree of angular freedom for lower bolt 113.

Figure 6:
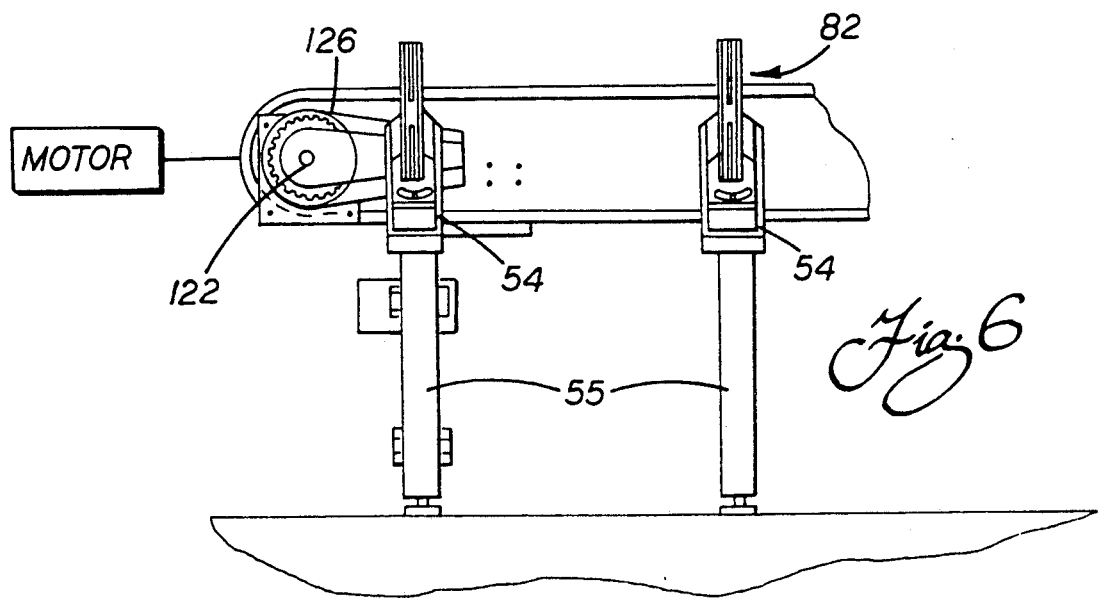
FIG. 6 is a side elevational view of the conveyor system of the present invention.

In the preferred embodiment and as shown in FIG. 6, an electric motor provides the driving force for the conveyor belt. The motor with drive shaft 122 rotates the driving sprocket 126. Thus, the drive shaft rotary motion is transmitted to the conveyor belt 10.

The belt engaging sprockets 126 may include an integral friction clutch assembly (not shown). The clutch is provided as a failsafe mechanism. More specifically, if for some reason the conveyor belt 10 is stopped or otherwise prevented from freely operating, the friction clutch disengages to allow the conveyor belt 10 to idle without damage to the belt 10 or motor.

In summary, numerous benefits have been described which result from employing the concepts of the present invention. The conveyor frame 46 includes two guide rails 48, 50 to guide and support the conveyor belt 10 in both the feed and return directions. Advantageously, this simplifies installation and reduces overall space requirements, system complexity and cost. One or more side rails 80 is provided to positively retain product on the conveyor belt 10. The side rails 80 are securely attached to side rail brackets 82. The side rail brackets 82 are substantially prevented from lateral movement by the tight engagement of the ridged outer surfaces 88 of horizontally extending legs 86 with the grooved side surfaces 94 within the lateral bore 58. Further support against lateral movement is provided by the smooth faced inner surfaces of the horizontally extending legs 86 frictionally engaging each other.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A product retaining/support frame assembly for a modular link conveyor belt comprising:
   guide rail means, said guide rail means including upper and lower horizontally extending lips for engaging and guiding said conveyor belt on both feed and return paths;
   product retaining means in spaced relation to the outer edges of said conveyor belt and in a plane perpendicular to and above the surface of said conveyor belt;
   transverse support means for retaining said guide rail means and receiving and supporting said product retaining means, said transverse support means including a bore with grooved surfaces to cooperatively mate with ridged surfaces on said product retaining means so as to form a tight frictional engagement between said transverse support means and said product retaining means while allowing lateral adjustment; and
   support bracket means attached to said guide rail means.

2. The assembly of claim 1 wherein said product retaining means includes a plurality of side rails attached to side rail brackets for maintaining transported product within the envelope of said conveyor belt.

3. The assembly of claim 2 wherein said side rail brackets include a vertically projecting leg and a horizontally projecting leg so as to be substantially L-shaped.

4. The assembly of claim 34 wherein said vertically projecting legs include a slot, said slot receiving attaching means for one or more of said side rails.

5. The assembly of claim 4 wherein said side rail attaching means includes a side rail engaging member positioned on a face of said vertical projecting leg of said bracket facing said conveyor belt and a lock plate positioned on a face of said vertically projecting leg facing away from said conveyor belt, said side rail engaging member and said lock plate cooperatively connected.

6. The assembly of claim 1 wherein said ridged surfaces are provided on an outer face of said horizontally projecting leg, said leg further having a substantially flat inner face.

7. The assembly of claim 1 wherein said support bracket means includes a slot for receiving a fluid collecting tray.

* * * * *